United States Patent
Bulea

(10) Patent No.: US 9,158,413 B2
(45) Date of Patent: Oct. 13, 2015

(54) SYSTEMS AND METHODS FOR REDUCING EFFECTS OF INTERFERENCE IN INPUT DEVICES

(75) Inventor: Mihai Bulea, Santa Clara, CA (US)

(73) Assignee: Synaptics Incorporated, San Jose, CA (US)

( * ) Notice: Subject to any disclaimer, the term of this patent is extended or adjusted under 35 U.S.C. 154(b) by 657 days.

(21) Appl. No.: 13/528,607

(22) Filed: Jun. 20, 2012

(65) Prior Publication Data
US 2013/0346008 A1 Dec. 26, 2013

(51) Int. Cl.
*G06F 3/044* (2006.01)
*G06F 3/041* (2006.01)

(52) U.S. Cl.
CPC .............. *G06F 3/0418* (2013.01); *G06F 3/044* (2013.01)

(58) Field of Classification Search
CPC ....................................................... G06F 3/044
USPC .......................................................... 702/85
See application file for complete search history.

(56) References Cited

U.S. PATENT DOCUMENTS

| | | |
|---|---|---|
| 2008/0040079 A1 | 2/2008 | Hargreaves |
| 2010/0079402 A1 | 4/2010 | Grunthaner et al. |
| 2010/0110037 A1 | 5/2010 | Huang et al. |
| 2010/0292945 A1 | 11/2010 | Reynolds et al. |
| 2010/0295564 A1 | 11/2010 | Reynolds |
| 2012/0068949 A1 | 3/2012 | Washburn et al. |
| 2013/0257792 A1* | 10/2013 | Trent et al. .................... 345/174 |

FOREIGN PATENT DOCUMENTS

WO     2009079221 A2     6/2009

OTHER PUBLICATIONS

International Searching Authority, International Search Report and Written Opinion for International Application No. PCT/US2013/046259, mailed Sep. 25, 2013.

* cited by examiner

*Primary Examiner* — Bryan Bui
(74) *Attorney, Agent, or Firm* — Osha Liang LLP

(57) ABSTRACT

The embodiments described herein provide devices and methods that facilitate improved input device performance. Specifically, the devices and methods provide improved resistance to the effect of interference on input devices, and in particular, to the effect of unison noise on proximity sensors that use capacitive techniques to generate images of sensor values. The devices and methods provide improved resistance to the effects of interface by using multiple images of sensor values, where the multiple images of sensor values are captured at different times along two different axes. The multiple images of sensor values are combined to produce a modified image of sensor values, the modified image having reduced errors due to noise. This reduction in errors due to noise can improve the accuracy and performance of the input device.

22 Claims, 6 Drawing Sheets

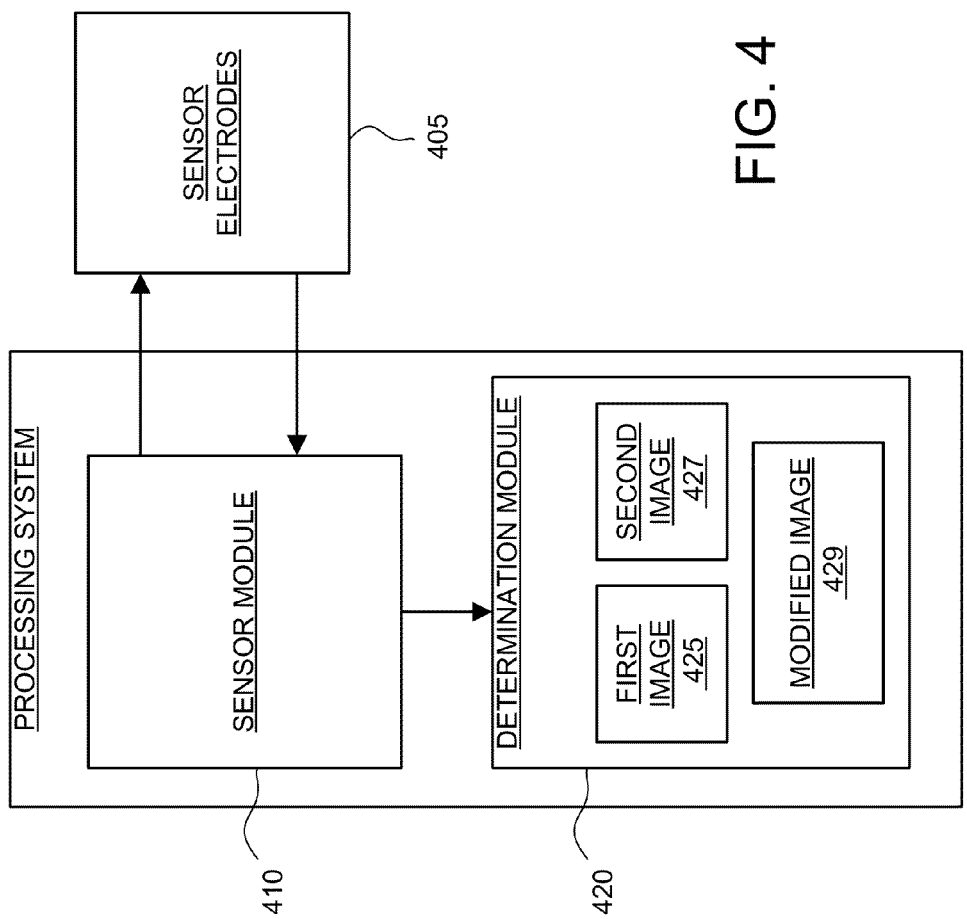

SYSTEMS AND METHODS FOR REDUCING EFFECTS OF INTERFERENCE IN INPUT DEVICES

FIELD OF THE INVENTION

This invention generally relates to electronic devices, and more specifically relates to input devices.

BACKGROUND OF THE INVENTION

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers, or as transparent sensor devices integrated with display screens to provide a touch screen interface).

Many proximity sensor devices use capacitive techniques to sense input objects. Such proximity sensor devices may typically incorporate either profile capacitive sensors or capacitive image sensors. Capacitive profile sensors alternate between multiple axes (e.g., x and y), while capacitive image sensors scan multiple transmitter rows to produce a more detailed capacitive "image" of "pixels" associated with an input object. While capacitive image sensors are advantageous in a number of respects, some implementations may be particularly vulnerable to various types of interference, including various types of noise.

Interference can originate from various sources, including display backlights, power supplies, wireless communication devices and the like. Although many sensors now include filtering that can effectively remove many types of interference, problems remain in identifying and/or removing some types of interference. One type of interference that may be problematic in some proximity sensor devices is referred to as "unison noise". One typical source for unison noise in some sensor devices is a nearby display screen, such as a liquid crystal display (LCD) used in many touch screen implementations.

In general, unison noise is a type of interference that is relatively spatially uniform over the sensing region, but varies nearly randomly over time. Specifically, because many image type sensor devices receive signals on a row-by-row or column-by-column basis, with each row or column receiving signals at different moments in time, each row or column in the sensor data can be uniformly shifted up or down by random amounts. This results in row-to-row or column-to-column variations that can negatively impact the performance of an image proximity sensor device.

Thus, while capacitive image proximity sensor devices are advantageous in a number of respects, there is a continuing need to improve the performance of such devices. For example, to improve the responsiveness of such sensors, or to improve the sensor's resistance to various types of interference, including various types of unison noise.

Other desirable features and characteristics will become apparent from the subsequent detailed description and the appended claims, taken in conjunction with the accompanying drawings and the foregoing technical field and background.

BRIEF SUMMARY OF THE INVENTION

The embodiments of the present invention provide devices and methods that facilitate improved input device performance. Specifically, the devices and methods provide improved resistance to the effect of interference on input devices, and in particular, to the effect of unison noise on proximity sensors that use capacitive techniques to generate images of sensor values. The devices and methods provide improved resistance to the effects of interface by using multiple images of sensor values, where the multiple images of sensor values are captured at different times along two different axes. The multiple images of sensor values are combined to produce a modified image of sensor values, the modified image having reduced errors due to noise. This reduction in errors due to noise can improve the accuracy and performance of the input device.

In one embodiment, a processing system is provided for an input device having a plurality of sensor electrodes, where the processing system comprises a sensor module and a determination module. The sensor module comprises sensor circuitry configured to operate the plurality of sensor electrodes to capture first resulting signals and second resulting signals. The determination module is configured to generate a first image of sensor values from the first resulting signals, where the first image of sensor values has first errors associated with the first resulting signals being captured at different times along a first axis. The determination module is further configured to generate a second image of sensor values from the second resulting signals, where the second image of sensor values has second errors associated with the second resulting signals being captured at different times along a second axis different from the first axis. The determination module is further configured to produce a modified image of sensor values based on the first image of sensor values and the second image of sensor values, the modified image of sensor values having reduced errors compared with the first errors and the second errors. By providing a modified image having reduced errors, the processing system provides improved resistance to the effect of interference, and in particular, to the effect of unison noise, and thus can provide improved performance for the input device.

In another embodiment, an input device comprises a plurality of sensor electrodes configured to capacitively detect input objects in a sensing region and a processing system operatively coupled to the plurality of sensor electrodes. The processing system is configured to operate the plurality of sensor electrodes to capture first resulting signals and second resulting signals. The processing system is further configured to generate a first image of sensor values from the first resulting signals, where the first image of sensor values has first errors associated with the first resulting signals being captured at different times along a first axis. The processing system is further configured to generate a second image of sensor values from the second resulting signals, where the second image of sensor values has second errors associated with the second resulting signals being captured at different times along a second axis, where the second axis is different from the first axis. The processing system is further configured to produce a modified image of sensor values based on the first image of sensor values and the second image of sensor values, the modified image of sensor values having reduced errors compared with the first errors and the second errors. By providing a modified image having reduced errors, the input device thus provides improved resistance to the effect of interference, and in particular, to the effect of unison noise, and thus can provide improved performance for the input device.

BRIEF DESCRIPTION OF DRAWINGS

The preferred exemplary embodiment of the present invention will hereinafter be described in conjunction with the appended drawings, where like designations denote like elements, and:

FIG. 4 is a conceptual block diagram depicting a processing system in accordance with an embodiment of the invention.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary, or the following detailed description.

Figure 1:
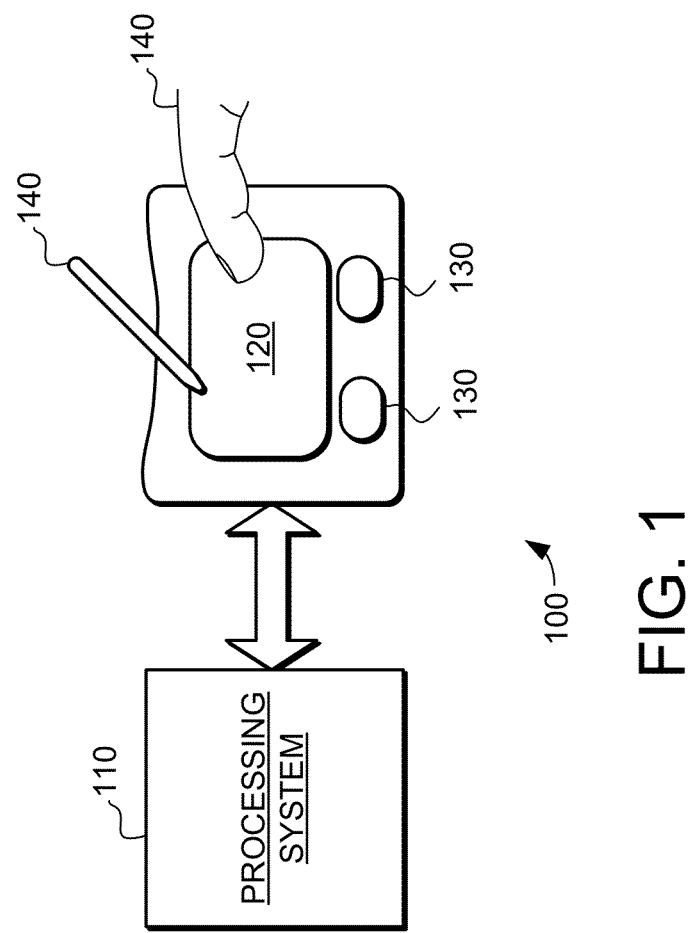
FIG. 1 is a block diagram of an exemplary system that includes an input device in accordance with an embodiment of the invention.

Various embodiments of the present invention provide input devices and methods that facilitate improved usability. FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which sensor electrodes reside, by face sheets applied over the sensor electrodes or any casings, etc. In some embodiments, the sensing region 120 has a rectangular shape when projected onto an input surface of the input device 100.

The input device 100 utilizes capacitive sensing to detect user input in the sensing region 120. To facilitate capacitive sensing, the input device 100 comprises one or more sensing electrodes for detecting user input.

Some implementations are configured to provide images that span one, two, three, or higher dimensional spaces. Some implementations are configured to provide projections of input along particular axes or planes.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

In accordance with the embodiments described herein, the input device is configured to utilize "transcapacitive" sensing methods. Transcapacitive sensing methods, sometimes referred to as "mutual capacitance", are based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In contrast, absolute capacitance sensing methods, sometimes referred to as "self capacitance", are based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

In FIG. 1, processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, as described above, the processing system 110 may include the circuit components for operating the plurality of sensor electrodes to capture first resulting signals and second resulting signals as part of a transcapacitive sensing technique.

In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s). In accordance with the embodiments described herein, the sensor module may be configured to operate the plurality of sensor electrodes to capture first resulting signals and second resulting signals. A further example includes determination modules, where the determination module is configured to generate a first image of sensor values from the first resulting signals, where the first image of sensor values has first errors associated with the first resulting signals being captured at different times along a first axis. The determination module may be further configured to generate a second image of sensor values from the second resulting signals, where the second image of sensor values has second errors associated with the second resulting signals being captured at different times along a second axis different from the first axis. The determination module may be further configured to produce a modified image of sensor values based on the first image of sensor values and the second image of sensor values, the modified image of sensor values having reduced errors compared with the first errors and the second errors.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like. In one embodiment, processing system 110 includes a determination module configured to determine positional information for an input device based on the measurement.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

As will be described in greater detail below, such display screens can be a source of interference for the input device 100. Specifically, in some embodiments the display screen can be a source of unison noise that may interference with the input device. In some applications shielding may be provided to reduce the effects of the unison noise on the input device 100. For example, with one or more electrical shield layers provided between the display screen and the electrodes. In such cases the electrical shield layer may be driven to a suitable shielding potential.

However, in some embodiments it may be desirable to implement the input device 100 with no electrical shield layer between the sensor electrodes and the display and associated display circuitry. This will naturally result in the sensor electrodes being subjected to more interference from the display screen. However, the embodiments described herein provide the ability to reduce the effects of unison noise, and thus may be used to reduce the need for such a shield layer. This can reduce the cost and complexity of the input device 100, as well as the stack height needed for the input device 100.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

In accordance with various embodiments of the invention, the input device 100 is configured with the processing system 110 coupled to a plurality of capacitive sensor electrodes (not shown in FIG. 1). In general, the input device 100 is configured to have improved resistance to the effect of interference, and in particular, to the effect of unison noise on the input device 100. To facilitate this, the processing system 110 uses multiple images of sensor values, where the multiple images of sensor values are captured at different times along two different axes. Processing system 110 combines the multiple images of sensor values to produce a modified image of sensor values, the modified image having reduced errors due to noise. This reduction in errors due to noise can improve the accuracy and performance of the input device 100.

In one embodiment, the processing system 110 is configured to operate the plurality of sensor electrodes to capture first resulting signals and second resulting signals. The processing system 110 is further configured to generate a first image of sensor values from the first resulting signals, where the first image of sensor values has first errors associated with the first resulting signals being captured at different times along a first axis. The processing system 110 is further configured to generate a second image of sensor values from the second resulting signals, where the second image of sensor values has second errors associated with the second resulting signals being captured at different times along a second axis, where the second axis is different from the first axis. The processing system 110 is further configured to produce a modified image of sensor values based on the first image of sensor values and the second image of sensor values, the modified image of sensor values having reduced errors compared with the first errors and the second errors. By providing a modified image having reduced errors, the input device 100 thus provides improved resistance to the effect of interference, and in particular, to the effect of unison noise, and thus can provide improved performance for the input device 100.

Figure 2A:
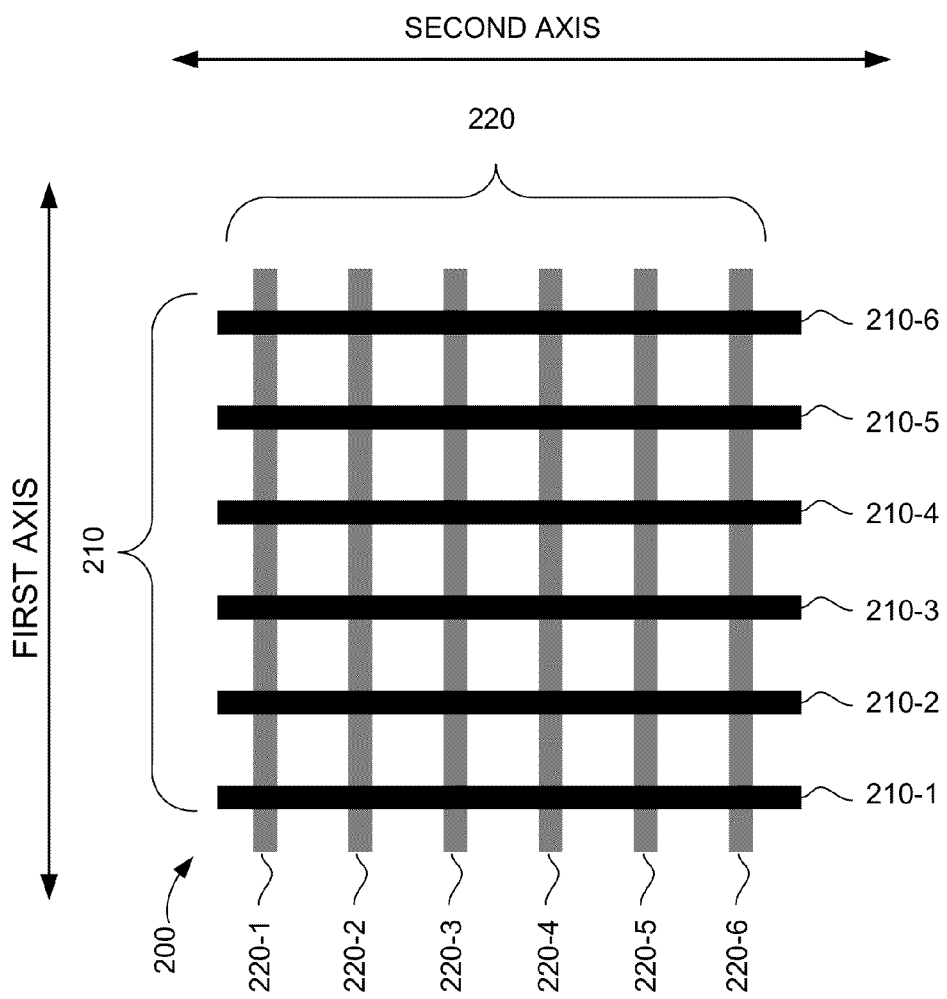
FIGS. 2A and 2B are block diagrams of sensor electrodes in accordance with exemplary embodiments of the invention.
Figure 2B:
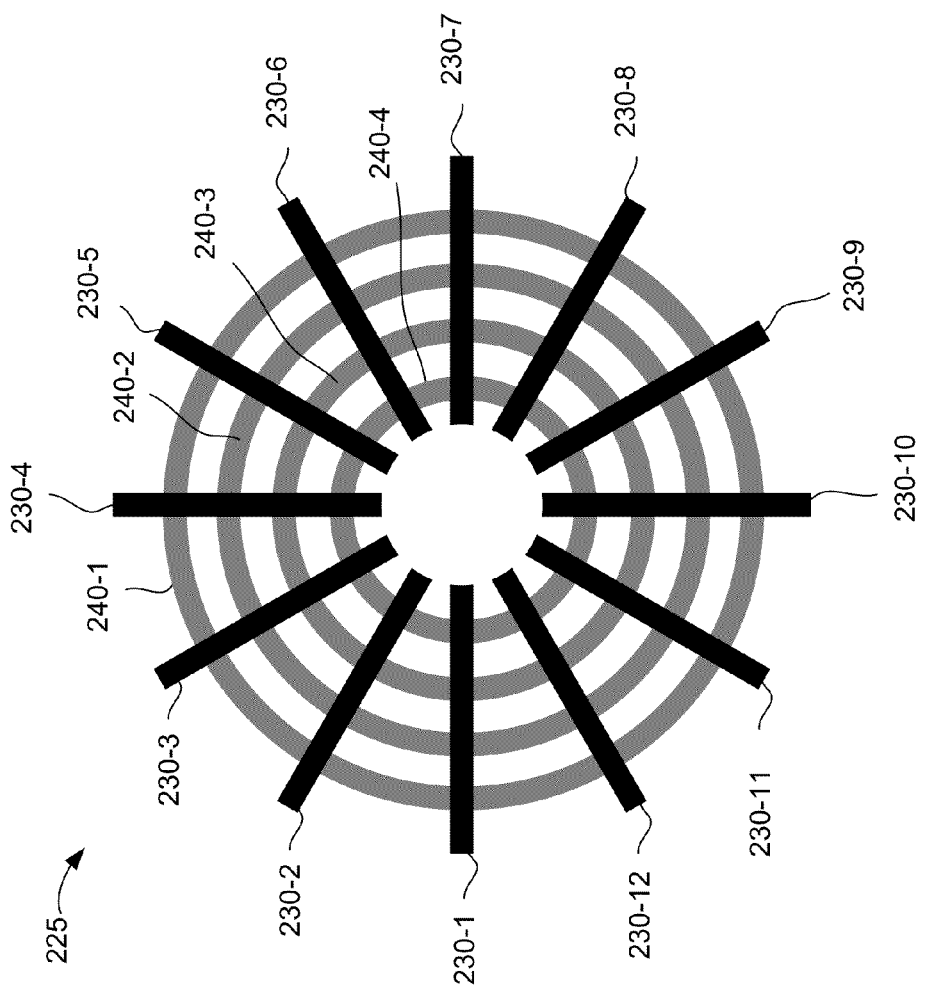

As was described above, the processing system 110 is coupled to sensor electrodes to determine user input. Specifically, the processing system operates by detecting the capacitive coupling between one or more transmitter sensor electrodes and one or more receiver sensor electrodes. Turning now to FIG. 2, these figures conceptually illustrate exemplary sets of capacitive sensor electrodes configured to sense in a sensing region. Specifically, FIG. 2A shows electrodes 200 in a rectilinear arrangement, while FIG. 2B shows electrodes 225 in a radial/concentric arrangement. However, it will be appreciated that the invention is not so limited, and that a variety of electrode shapes and arrangements may be suitable in any particular embodiment.

Turning now to FIG. 2A, in the illustrated embodiment the capacitive sensor electrodes 200 comprise first sensor electrodes 210 and second sensor electrodes 220. Specifically, in the illustrated embodiment, the first sensor electrodes 210 comprise six electrodes 210-1 to 210-6, and the second sensor electrodes 220 comprise six electrodes 220-1 to 220-6. Each of the first sensor electrodes 210 is arranged to extend along a second axis. Specifically, each first sensor electrode 210 has a major axis that extends along the second axis. It should also be noted that the first sensor electrodes 210 are distributed in an array, with each of the first sensor electrodes 210 positioned a distance from adjacent first sensor electrodes 210 and corresponding to a different position in the first axis.

Likewise, each of the second sensor electrodes 220 is arranged to extend along a first axis, where the first and second axes are different axis. Specifically, each second sensor electrode 220 has a major axis that extends along the first axis. It should also be noted that the second sensor electrodes 220 are distributed in an array, with each of the second sensor electrodes 220 positioned a distance from adjacent second sensor electrodes 220 and corresponding to a different position in the second axis.

Sensor electrodes 210 and 220 are typically ohmically isolated from each other. That is, one or more insulators separate sensor electrodes 210 and 220 and prevent them from electrically shorting to each other. In some embodiments, sensor electrodes 210 and 220 are separated by insulative material disposed between them at cross-over areas; in such constructions, the sensor electrodes 210 and/or sensor electrodes 220 may be formed with jumpers connecting different portions of the same electrode. In some embodiments, sensor electrodes 210 and 220 are separated by one or more layers of insulative material. In some other embodiments, sensor electrodes 210 and 220 are separated by one or more substrates; for example, they may be disposed on opposite sides of the same substrate, or on different substrates that are laminated together. The capacitive coupling between the transmitter electrodes and receiver electrodes change with the proximity and motion of input objects in the sensing region associated with the transmitter electrodes and receiver electrodes.

In transcapacitive sensing, the sensor pattern is "scanned" to determine the capacitive couplings between transmitter and receiver electrodes. That is, the transmitter electrodes are driven to transmit transmitter signals and the receiver electrodes are used acquire the resulting signals. The resulting signals are then used to determine measurements of the capacitive couplings between electrodes, where each capacitive coupling between a transmitter electrode and a receiver electrode provides one "capacitive pixel". A set of measured values from the capacitive pixels form a "capacitive image" (also commonly referred to as a "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In accordance with the embodiments described herein the electrodes 200 are configured to be operated to generate first and second resulting signals. Specifically, the electrodes 200 are operated to generate a first image of sensor values from the first resulting signals, and generate a second image of sensor values from the from the second resulting signals. As described above, the first and second images are generated by selectively transmitting transmitter signals and receiving resulting signals with the electrodes.

In such transmitting and receiving, the resulting signals are captured as sets, with each set captured substantially simultaneously, and each set corresponding to a different position along one of the axis. For example, the first resulting signals are captured as sets, with each set corresponding to a different position along the first axis, and each set being captured at a different time. Likewise, the second resulting signals are captured as sets, with each set corresponding to a different position along the second axis, and each set being captured at a different time. This can be accomplished by capturing the first resulting signals on a set by set basis with sensor electrodes 220, and capturing the second resulting signals on a set by set basis with sensor electrodes 210. In this example, the first resulting signals are generated on a "column-by-column" basis to generate the first image of sensor values, while the second resulting signals are generated on a "row-by-row" basis to generate the second image of sensor values.

With the first resulting signals generated on a "column-by-column" basis to generate the first image of sensor values the first resulting signals are captured substantially simultaneously, but at different times along the first axis. Specifically, each column of resulting signals is captured at a different time, and taken together are used to generate the first image of sensor values. In the embodiment of FIG. 2A, a first transmitter signal (where "first" indicates it is used to generate the first resulting signals) may be transmitted with electrode 210-1, and first resulting signals captured with each of the receiver electrodes 220-1 to 220-6, where each first resulting signal comprises effects of the first transmitter signal. These six first resulting signals comprise a set (corresponding to a column) of first resulting signals that may be used to generate the first image of sensor values. Specifically, from each of these six first resulting signals provides a capacitive measurement that corresponds to a pixel in the first capacitive image, and together the six pixels make up a column in the first capacitive image.

Another first transmitter signals may then be transmitted with electrode 210-2, and again first resulting signals may then be captured with each of the receiver electrodes 220-1 to 220-6. This comprises another column of first resulting signals that may be used to generate the first image. This process may be continued, transmitting from electrodes 210-3, 210-4, 210-5 and 210-6, with each transmission generating another column of first resulting signals until the complete first image of sensor values is generated. It should be noted that the first resulting signals that make up each column are captured substantially simultaneously, but that different columns correspond to different positions along the first axis and are captured at different times. As was described above, and will be described in greater detail below, the effects of unison noise are such that errors may be introduced that are associated with these sets of first resulting signals being captured at different times along the first axis.

Likewise, with the second resulting signals generated on a "row-by-row" basis to generate the second image of sensor values the second resulting signals are captured substantially simultaneously, but at different times along the second axis. Specifically, each row of resulting signals is captured at a different time, and taken together are used to generate the image of sensor values. In the embodiment of FIG. 2A, a second transmitter signal (where "second" indicates it is used to generate the second resulting signals) may be transmitted with electrode 220-1, and second resulting signals captured with each of the receiver electrodes 210-1 to 210-6, where each second resulting signal comprises effects of the second transmitter signal. These six second resulting signals comprise a set (corresponding to a row) of second resulting signals that may be used to generate the second image of sensor values. Specifically, each of these six second resulting signals provides a capacitive measurement that corresponds to a pixel in the second capacitive image, and together the six pixels make up a row in the second capacitive image.

Another second transmitter signals may then be transmitted with electrode 220-2, and again second resulting signals may then be captured with each of the receiver electrodes 210-1 to 210-6. This comprises another row of second resulting signals that may be used to generate the second image. This process may be continued, transmitting from electrodes 220-3, 220-4, 220-5 and 220-6, with each transmission generating another row of second resulting signals until the complete second image of sensor values is generated. It should be noted that the second resulting signals that make up each row are captured substantially simultaneously, but that different rows correspond to different positions along the second axis, and the different rows are captured at different times. As was described above, and will be described in greater detail below, the effects of unison noise are such that errors may be introduced that are associated with the second resulting signals being captured at different times along the second axis.

It should be noted that in the example described above the resulting signals for the first and second images are described as being captured in an alternating manner. Specifically, the six "column" resulting signals are captured with electrodes 220-1 to 220-6 for the first image, and then six "row" resulting signals are captured with electrodes 210-1 to 210-6 for the second image. Thus, complete images are generated before the next image is generated. However this is just one example of how such images may be generated.

As another example, the resulting signals for the first and second images may be captured in an interleaving manner. This may be done by capturing a resulting signal for the first image, and then capturing a resulting signal for the second image, and so forth. As one specific example, a "column" resulting signal may be captured with electrode 220-1, and then a "row" resulting signal captured with electrode. 210-1. Such capturing would continue with a second "column" resulting signal captured with electrode 220-2, and then a second "row" resulting signal captured with electrode 220-1. This would continue until the first and second images are generated. Such an alternating manner may provide better resistance to motion artifacts, for example.

Figure 3B:
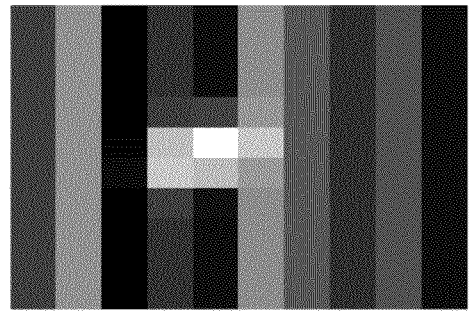
FIGS. 3A and 3B are graphical representation of exemplary images of sensor values.
Figure 3A:
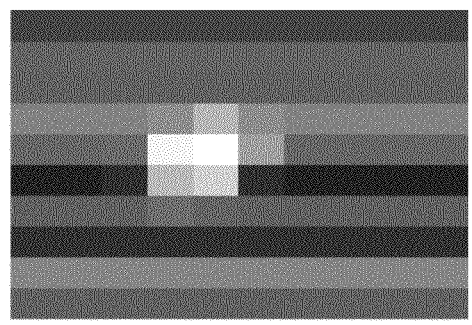

Turning now to FIGS. 3A and 3B, graphical representations of an exemplary first capacitive image 300 and an exemplary second capacitive image 302 are illustrated. In FIGS. 3A and 3B, the magnitudes of the sensor values are represented in greyscale, with larger magnitudes appearing as lighter in shade. In the example of FIGS. 3A and 3B, an input object such as a finger is present in the sensing region, as indicated by the relatively lighter area near the center of images. FIGS. 3A and 3B also show examples of the effects of unison noise on the accuracy of the capacitive images. Specifically, although unison noise is substantially spatially uniform over the sensing region, it varies in time. Thus, when the electrodes are selectively driven to transmit and capture resulting signals on a column-by-column and row-by-row basis each of the resulting columns and rows of resulting signals will likely be affected by a different amount of unison noise. This varying amount of noise in each column and row results can cause "offsets and other errors in the generated capacitive images. Examples of such unison noise generated errors can be seen as the vertical banding in FIG. 3A. This vertical banding results from the offsets in the column-by-column captured resulting signals. Other examples of such unison noise generated errors can be seen in the horizontal banding in FIG. 3B. This horizontal banding results from the offsets in the row-by-row captured resulting signals. As described above, one possible source for such unison noise is a nearby display, such as a liquid crystal display (LCD). As will be described below, the various embodiments described herein provide techniques to reduce the effects of such banding by generating modified images from such first and second capacitive images of sensor values. Thus, the various embodiments can be used to facilitate touch screen devices that use such displays, and more particularly can be used to facilitate such devices without requiring the need for shielding between such displays and the sensor electrodes.

Returning briefly to FIG. 2A, it should be noted that in the embodiment described above the sensor electrodes 210 and 220 are both configured to be selectively operated as receiver electrodes and transmitter electrodes. Thus, the sensor electrodes 210 are operated as transmitter electrodes while the sensor electrodes 220 are operated as receiver electrodes to generate the first image of sensor values. Likewise, the sensor electrodes 220 are operated as transmitter electrodes while the sensor electrodes 210 are operated as receiver electrodes to generate images to generate the second image sensor values. Such an embodiment may provide an advantage in that it does not require additional transmitter and/or receiver electrodes to generate the first and second images. This can reduce the complexity and cost to form the electrodes and thus can reduce the cost of the input device. However, it should be noted that this is just one example, and that in other embodiments each of the electrodes are not used as both a transmitter and receiver. In such embodiments two substantially overlapped arrays of transmitter electrodes and/or two arrays of receiver electrodes can be used instead of selectively using each electrode as both a receiver and a transmitter.

It should next be noted again that while the embodiment illustrated in FIG. 2A shows sensor electrodes arranged in a rectilinear grid, that is this is just one example arrangement of the electrodes. In another example, the electrodes may be arranged to facilitate position information determination in polar coordinates (e.g., r, $\Theta$). Turning now to FIG. 2B, capacitive sensor electrodes 225 in a radial/concentric arrangement are illustrated. Such electrodes are examples of the type that can be used to determine position information in polar coordinates.

In the illustrated embodiment, the first sensor electrodes 230 comprise 12 electrodes 230-1 to 230-12 that are arranged radially, with each of the first sensor electrodes 230 starting near a center point and extending in different radial directions outward. In the illustrated embodiment the second sensor electrodes 240 comprise four electrodes 240-1 to 240-4 that are arranged in concentric circles arranged around the same center point, with each second sensor electrode 240 spaced at different radial distances from the center point. So configured, the first sensor electrodes 230 and second sensor electrodes 240 can be used to generate first and second images of sensor values. For example, by selectively transmitting first transmitter signals with the first sensor electrodes 230 (i.e., the radially arranged electrodes) and selectively receiving first resulting signals with the second sensor electrodes 240 (i.e., the concentrically arranged electrodes) to generate the first image of sensor values. Likewise, by selectively transmitting second transmitter signals with the second sensor electrodes 240 (i.e., the concentrically arranged electrodes) and selectively receiving second resulting signals with the first sensor electrodes 230 (i.e., the radially arranged electrodes) to generate the second image of sensor values. Again, such images may be affected by unison noise and errors may result from this unison noise. Accordingly, a modified image of sensor values may be generated based on the first image of sensor values and the second image of sensor values, the modified image of sensor values having reduced errors compared with errors in the first image and second image of sensor values.

Referring now to the conceptual block diagram depicted in FIG. 4, one embodiment of an exemplary processing system 110 as shown in FIG. 1 may include a system 400. System 400, as illustrated, generally includes sensor module 410 communicatively coupled via a set of sensor electrodes (or simply "electrodes") 405, to determination module 420. In one specific embodiment, for example, the sensor electrodes 405 are implemented as described above in connection with FIG. 2A or 2B.

Sensor module 410 may include any combination of hardware and/or software configured to operate the sensor electrodes, for example by selectively transmitting signals with some portion of the electrodes 405 and selectively receiving resulting signals with some portion of the electrodes 405. In these embodiments the sensor module 410 may be determined to provide the transmitter signals in a variety of formats. For example, the transmitter signals may comprise any one of a sinusoidal waveform, square waveform, triangular waveform, sawtooth waveform or the like. The transmitter signals may also transmitted in different signal sidebands or in different phases, or in different combinations thereof.

In the illustrated embodiment, determination module 420 includes any combination of hardware and/or software configured to receive the resulting signals from sensor module 410 and generate images of sensor values. Specifically, to receive first resulting signals and to generate a first image of sensor values 425. As described above, these resulting signals can be received on a set-by-set basis, where, for example each set corresponds to a column or row of pixels in the images of sensor values. Due to the effects of unison noise and the set by set basis in which the first resulting signals are received, the first image of sensor values 425 can have associated first errors. Likewise, the sensor module is configured to receive sensor resulting signals and to generate a second image of sensor values 427. Again, due to the effects of unison noise and the set by set basis in which the second resulting signals are received, the second image of sensor values 427 can have associated second errors.

The determination module 420 also includes any combination of hardware and/or software configured to generate a modified image of sensor values 429 based on the first image of sensor values 425 and the second image of sensor values 427, the modified image of sensor values 429 generated to have reduced errors compared with the associated first errors in the first image 425 and the associated second errors in the second image 429. According to various embodiments, the reduced errors may be associated with a global error, a local error, or an aggregated error of image sensor values. From the modified image 429 the determination module can determine positional information for input objects in the sensing region using any suitable technique. For example, by generating multiple modified images 425 over time and appropriately analyzing the images 425, the positions and/or motions of one or more input objects can be determined and used to generate appropriate responses on an associated electronic device.

Figure 5:
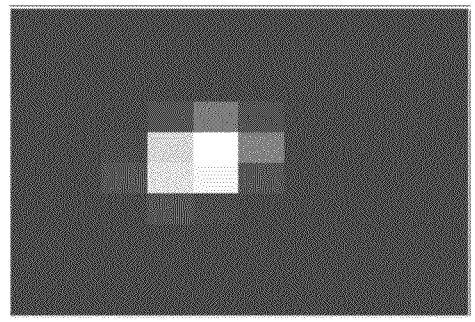
FIG. 5 is a graphical representation of an exemplary modified image of sensor values in accordance with an embodiment of the invention.

Turning now to FIG. 5, a graphical representation of an exemplary modified capacitive image 502 is illustrated. Again, in FIG. 5 the magnitudes of the sensor values are represented in grey scale, with larger magnitudes appearing as lighter in shade. Again, in the example of FIG. 5, an input object such as a finger is present in the sensing region, as indicated by the relatively lighter area near the center of images.

As can be seen in a comparison of FIG. 5 with FIGS. 3A and 3B, the modified capacitive image 502 has much reduced unison noise caused errors. That is, the modified image 502 has both reduced vertical and horizontal banding that was shown in FIGS. 3A and 3B. Thus, the modified image may be reliably used to determine positional information for input objects in the sensing region.

Returning to FIG. 4, the determination module 420 can be configured to produce the modified image of sensor values 429 using a variety of different techniques. In general, the techniques are implemented to use information from the first image 425 and second image 427 to reduce the error in the modified image 429. Specifically, these techniques modify the sensor values in the images in a way that reduces the error in each of the pixels of the image. In one specific example, the technique is implemented to modify the sensor values in a way that produces a modified image 429 with a reduced error.

As one example, the determination module 420 can be configured to produce the modified image of sensor values 429 using least mean squares of the first errors and the second errors. Specifically, the determination module 420 can be configured to modify the sensor values in a way that minimizes the least mean squares of the errors. This would result in a reduced error in the modified image 429.

As another example, the determination module can be configured to produce the modified image of sensor values 429 using a gradient descent approach. In this example, the determination module 429 is configured to minimize the first errors and second errors by determining the gradient of the errors and taking iterative steps proportional to the negative of the gradient. In a further embodiment, the determination module 429 is configured to minimize the first errors and second errors by determining where the partial differential equations of the first and second errors are equal to zero.

As another example, the determination module 420 can be configured to produce the modified image of sensor values 429 using deconvolution values stored in a memory. As one example, a matrix of deconvolution values is implemented in the determination module 420. This deconvolution matrix allows the determination module 420 to use the first and second images to deconvolve the effects of the unison noise from the true sensor values. So implemented, the deconvolution matrix is used to produce a modified image of sensor values 429 when inputted with the first image of sensor values 425 and second image of sensor values 427.

As described above, the sensor values in the first image 425 and second image 427 are all affected by either column-by-column errors or row-by-row errors. Each value in each row or column of values is thus shifted by the same random offset value. The deconvolution matrix is configured to reduce those offsets by "aligning" the two images 425 and 427. This is done by an optimization process during which the alignment error is reduced.

In a simplified example, images are 2×2, that is with four pixels. The four sensor values for the four pixels can be represented as:

$$\begin{bmatrix} A & B \\ C & D \end{bmatrix} \quad (1)$$

Where A, B, C, D are the true sensor values, unaffected by the unison noise. It is these values that are to be determined to produce the modified image. In this example, the first image has two rows captured sequentially, with the effects of unison noise such that the two rows are shifted with the offsets $\alpha, \beta$. Likewise, the second image has two columns read sequentially, with the effects of unison noise such that the two columns are shifted with the offsets $\phi, \theta$. This leads to the following eight equations:

$$A^V = A + \phi \, B^V = B + \theta$$

$$C^V = C + \phi \, D^V = D + \theta \quad (2)$$

$$A^H = A + \alpha \, B^H = B + \alpha$$

$$C^H = C + \beta \, D^H = D + \beta$$

Where $A^V, B^V, C^V$, and $D^V$ are the thus the measured sensor values in the first image, including the effects of the unison noise, and $A^H, B^H, C^H$, and $D^H$ are the thus the measured sensor values in the second image, including the effects of the unison noise. Thus, for this simple case there are eight linear equations with eight unknowns (four actual sensor values and four offsets). In this example, the deconvolution matrix would be configured to solve these eight linear equations, and thus determine the four actual sensor values in the modified image.

A more detailed example will now be described. In this example, the first and second images can be modeled as $$P_{ij}^{(V)} = P_{ij} + a_i, \forall i,j$$

$$P_{ij}^{(H)} = P_{ij} + b_j, \forall i,j \quad (3)$$

where $P_{ij}^{(V)}$ is the value of a pixel captured for a column in the first image, , , , $P_{ij}$ is the true pixel value, $a_i$ is the error associated with all pixels captured for a column in the first image, , , , $P_{ij}^{(H)}$ is the value of a pixel captured for a row in the second image, and $b_j$ is the error associated with all pixels captured for a row in the second image. In this example, the total error to be reduced can be represented as:

$$E = \sum_{j=0}^{N-1}\sum_{i=0}^{M-1}\left[(P_{ij} + a_i - P_{ij}^{(V)})^2 + (P_{ij} + b_j - P_{ij}^{(H)})^2\right] \quad (4)$$

In particular, $(P_{ij} + a_i - P_{ij}^{(V)})$ gives the error for a pixel in the first image and $P_{ij} + b_j - P_{ij}^{(H)}$ gives the error for a pixel in the second image. For example, $P_{ij}^{(V)}$ is the value measured value of a pixel and $P_{ij} + a_i$ are the components of the pixel value due to the true value of the pixel and the error. The portion of the equation, $$\sum_{j=0}^{N-1}\sum_{i=0}^{M-1}[\ldots],$$

is a summation of the errors for all of the pixels for both the first and second images.

Partial differential equations of the error are used to determine points having minimum errors:

$$\frac{\partial E}{\partial P_{ij}} = 0, \forall\, i,j,\quad \frac{\partial E}{\partial a_i} = 0, \forall\, i,\quad \frac{\partial E}{\partial b_j} = 0, \forall\, j \quad (5)$$

The three equations from (5) give:

$$\frac{\partial E}{\partial P_{ij}} = 0 \Rightarrow (P_{ij} - a_i - P_{ij}^{(V)}) + (P_{ij} + b_j - P_{ij}^{(H)}) = 0, \forall\, i, \forall\, j \quad (6)$$

$$\frac{\partial E}{\partial a_i} = 0 \Rightarrow \sum_{j=0}^{N-1}(P_{ij} + a_i - P_{ij}^{(V)}) = 0, \forall\, i$$

$$\frac{\partial E}{\partial b_j} = 0 \Rightarrow \sum_{i=0}^{M-1}(P_{ij} + b_j - P_{ij}^{(H)}) = 0, \forall\, j$$

Which can be written as:

$$2P_{ij} + a_i + b_j = P_{ij}^{(V)} + P_{ij}^{(H)}, \forall\, i, \forall\, j \quad (7)$$

$$\sum_{j=0}^{N-1} P_{ij} + Na_i = \sum_{j=0}^{N-1} P_{ij}^{(V)}, \forall\, i$$

$$\sum_{i=0}^{M-1} P_{ij} + Mb_j = \sum_{i=0}^{M-1} P_{ij}^{(H)}, \forall\, j$$

In matrix format, the three equations (7) can be written as:

$$\begin{bmatrix} 2 & \cdots & & & 1 & & & 1 & & & & & & \\ & 2 & \cdots & & & 1 & & & 1 & & & & & \\ & & 2 & \cdots & & & 1 & & & 1 & & & & \\ & & & \cdots & & & & & & & & & & \\ & & & & 2 & & & 1 & & & 1 & & & \\ & & & & & 2 & & & 1 & & & 1 & & \\ & & & & & & 2 & & & 1 & & & 1 & \\ & & & & & \cdots & & & & & & & & \\ & & & & & & & 2 & & & 1 & & & 1 \\ & & & & & & & & 2 & & & 1 & & 1 \\ & & & & & & & & & 2 & & & 1 & 1 \\ 1 & 0 & 0 & \cdots & 1 & 0 & 0 & \cdots & 1 & 0 & 0 & N & 0 & 0 & 0 & 0 \\ 0 & 1 & 0 & \cdots & 0 & 1 & 0 & \cdots & 0 & 1 & 0 & 0 & N & 0 & 0 & 0 \\ 0 & 0 & 1 & \cdots & 0 & 0 & 1 & \cdots & 0 & 0 & 1 & 0 & 0 & N & 0 & 0 \\ 1 & 1 & 1 & \cdots & 0 & 0 & 0 & \cdots & 0 & 0 & 0 & 0 & 0 & 0 & M & 0 & 0 \\ 0 & 0 & 0 & \cdots & 1 & 1 & 1 & \cdots & 0 & 0 & 0 & 0 & 0 & 0 & 0 & M & 0 \\ 0 & 0 & 0 & \cdots & 0 & 0 & 0 & \cdots & 1 & 1 & 1 & 0 & 0 & 0 & 0 & 0 & M \end{bmatrix} \quad (8)$$

$$\begin{bmatrix} P_{0,0} \\ P_{0,i} \\ P_{0,M-1} \\ \cdots \\ P_{j,0} \\ P_{j,i} \\ P_{j,M-1} \\ \cdots \\ P_{N-1,0} \\ P_{N-1,i} \\ P_{N-1,M-1} \\ a_0 \\ a_i \\ a_{M-1} \\ b_0 \\ b_j \\ b_{N-1} \end{bmatrix} = \begin{bmatrix} P_{0,0}^{(V)} + P_{0,0}^{(H)} \\ P_{0,i}^{(V)} + P_{0,i}^{(H)} \\ P_{0,M-1}^{(V)} + P_{0,M-1}^{(H)} \\ \cdots \\ P_{j,0}^{(V)} + P_{j,0}^{(H)} \\ P_{j,i}^{(V)} + P_{j,i}^{(H)} \\ P_{j,M-1}^{(V)} + P_{j,M-1}^{(H)} \\ \cdots \\ P_{N-1,0}^{(V)} + P_{N-1,0}^{(H)} \\ P_{N-1,i}^{(V)} + P_{N-1,i}^{(H)} \\ P_{N-1,M-1}^{(V)} + P_{N-1,M-1}^{(H)} \\ \sum_{j=0}^{N-1} P_{j,0}^{(V)} \\ \sum_{j=0}^{N-1} P_{j,i}^{(V)} \\ \sum_{j=0}^{N-1} P_{j,M-1}^{(V)} \\ \sum_{i=0}^{M-1} P_{0,i}^{(H)} \\ \sum_{i=0}^{M-1} P_{j,i}^{(H)} \\ \sum_{i=0}^{M-1} P_{N-1,i}^{(H)} \end{bmatrix}$$

To simplify these equations it can be safely assumed that that the noise $(a_i, b_j)$ will have a zero average. Since both $a_i, b_1$ can be modeled as random variables:

$$\sum_{i=0}^{M-1} a_i + \sum_{j=0}^{N-1} b_j = 0 \quad (9)$$

Or, if they have different statistical properties:

$$\frac{1}{M}\sum_{i=0}^{M-1} a_i = \frac{1}{N}\sum_{j=0}^{N-1} b_j = 0 \quad (10)$$

With the supposition (9) the matrix equation (8) can be written as (11) below, and with the supposition (10) the matrix equation (8) can be written as (12) below:

$$\begin{bmatrix} 2 & & & & \cdots & & & & 1 & & 1 & & & \\ & 2 & & & \cdots & & & & & 1 & & 1 & & \\ & & 2 & & \cdots & & & & & & 1 & & 1 & \\ & & & \cdots & & & & & & & & & & \\ & & & & 2 & & & & 1 & & & & 1 & \\ & & & & & 2 & & & & 1 & & & & 1 \\ & & & & & & 2 & & & & 1 & & & 1 \\ & & & & & \cdots & & & & & & & & \\ & & & & & & & 2 & 1 & & & & & 1 \\ & & & & & & & & 2 & 1 & & & & 1 \\ & & & & & & & & & 2 & 1 & & & 1 \\ 1 & 0 & 0 & \cdots & 1 & 0 & 0 & \cdots & 1 & 0 & 0 & N & 0 & 0 & 0 & 0 & 0 \\ 0 & 1 & 0 & \cdots & 0 & 1 & 0 & \cdots & 0 & 1 & 0 & 0 & N & 0 & 0 & 0 & 0 \\ 0 & 0 & 1 & \cdots & 0 & 0 & 1 & \cdots & 0 & 0 & 1 & 0 & 0 & N & 0 & 0 & 0 \\ 1 & 1 & 1 & \cdots & 0 & 0 & 0 & \cdots & 0 & 0 & 0 & 0 & 0 & 0 & M & 0 & 0 \\ 0 & 0 & 0 & \cdots & 1 & 1 & 1 & \cdots & 0 & 0 & 0 & 0 & 0 & 0 & 0 & M & 0 \\ 0 & 0 & 0 & \cdots & 0 & 0 & 0 & \cdots & 1 & 1 & 1 & 0 & 0 & 0 & 0 & 0 & M \\ 0 & 0 & 0 & \cdots & 0 & 0 & 0 & \cdots & 0 & 0 & 0 & N & N & N & M & M & M \end{bmatrix} \quad (11)$$

$$\begin{bmatrix} P_{0,0} \\ P_{0,i} \\ P_{0,M-1} \\ \cdots \\ P_{j,0} \\ P_{j,i} \\ P_{j,M-1} \\ \cdots \\ P_{N-1,0} \\ P_{N-1,i} \\ P_{N-1,M-1} \\ a_0 \\ a_i \\ a_{M-1} \\ b_0 \\ b_j \\ b_{N-1} \end{bmatrix} = \begin{bmatrix} P_{0,0}^{(V)} + P_{0,0}^{(H)} \\ P_{0,i}^{(V)} + P_{0,i}^{(H)} \\ P_{0,M-1}^{(V)} + P_{0,M-1}^{(H)} \\ \cdots \\ P_{j,0}^{(V)} + P_{j,0}^{(H)} \\ P_{j,i}^{(V)} + P_{j,i}^{(H)} \\ P_{j,M-1}^{(V)} + P_{j,M-1}^{(H)} \\ \cdots \\ P_{N-1,0}^{(V)} + P_{N-1,0}^{(H)} \\ P_{N-1,i}^{(V)} + P_{N-1,i}^{(H)} \\ P_{N-1,M-1}^{(V)} + P_{N-1,M-1}^{(H)} \\ \sum_{j=0}^{N-1} P_{j,0}^{(V)} \\ \sum_{j=0}^{N-1} P_{j,i}^{(V)} \\ \sum_{j=0}^{N-1} P_{j,M-1}^{(V)} \\ \sum_{i=0}^{M-1} P_{0,i}^{(H)} \\ \sum_{i=0}^{M-1} P_{j,i}^{(H)} \\ \sum_{i=0}^{M-1} P_{N-1,i}^{(H)} \\ 0 \end{bmatrix}$$

$$\begin{bmatrix} 2 & & & \cdots & & & 1 & & 1 & & & & \\ & 2 & & \cdots & & & & 1 & & 1 & & & \\ & & 2 & \cdots & & & & & 1 & & 1 & & \\ & & & \cdots & & & & & & & & & \\ & & & & 2 & & 1 & & & & 1 & & \\ & & & & & 2 & & 1 & & & & 1 & \\ & & & & & & 2 & & 1 & & & & 1 \\ & & & \cdots & & & & & & & & & \\ & & & & & 2 & 1 & & & & 1 & & \\ & & & & & & 2 & 1 & & & & 1 & \\ & & & & & & & 2 & 1 & & & & 1 \\ 1 & 0 & 0 & \cdots & 1 & 0 & 0 & \cdots & 1 & 0 & 0 & N & 0 & 0 & 0 & 0 & 0 \\ 0 & 1 & 0 & \cdots & 0 & 1 & 0 & \cdots & 0 & 1 & 0 & 0 & N & 0 & 0 & 0 & 0 \\ 0 & 0 & 1 & \cdots & 0 & 0 & 1 & \cdots & 0 & 0 & 1 & 0 & 0 & N & 0 & 0 & 0 \\ 1 & 1 & 1 & \cdots & 0 & 0 & 0 & \cdots & 0 & 0 & 0 & 0 & 0 & 0 & M & 0 & 0 \\ 0 & 0 & 0 & \cdots & 1 & 1 & 1 & \cdots & 0 & 0 & 0 & 0 & 0 & 0 & 0 & M & 0 \\ 0 & 0 & 0 & \cdots & 0 & 0 & 0 & \cdots & 1 & 1 & 1 & 0 & 0 & 0 & 0 & 0 & M \\ 0 & 0 & 0 & \cdots & 0 & 0 & 0 & \cdots & 0 & 0 & 1 & 1 & 1 & 0 & 0 & 0 \\ 0 & 0 & 0 & \cdots & 0 & 0 & 0 & \cdots & 0 & 0 & 0 & 0 & 0 & 1 & 1 & 1 \end{bmatrix} \quad (12)$$

$$\begin{bmatrix} P_{0,0} \\ P_{0,i} \\ P_{0,M-1} \\ \cdots \\ P_{j,0} \\ P_{j,i} \\ P_{j,M-1} \\ \cdots \\ P_{N-1,0} \\ P_{N-1,i} \\ P_{N-1,M-1} \\ a_0 \\ a_i \\ a_{M-1} \\ b_0 \\ b_j \\ b_{N-1} \end{bmatrix} = \begin{bmatrix} P_{0,0}^{(V)} + P_{0,0}^{(H)} \\ P_{0,i}^{(V)} + P_{0,i}^{(H)} \\ P_{0,M-1}^{(V)} + P_{0,M-1}^{(H)} \\ \cdots \\ P_{j,0}^{(V)} + P_{j,0}^{(H)} \\ P_{j,i}^{(V)} + P_{j,i}^{(H)} \\ P_{j,M-1}^{(V)} + P_{j,M-1}^{(H)} \\ \cdots \\ P_{N-1,0}^{(V)} + P_{N-1,0}^{(H)} \\ P_{N-1,i}^{(V)} + P_{N-1,i}^{(H)} \\ P_{N-1,M-1}^{(V)} + P_{N-1,M-1}^{(H)} \\ \sum_{j=0}^{N-1} P_{j,0}^{(V)} \\ \sum_{j=0}^{N-1} P_{j,i}^{(V)} \\ \sum_{j=0}^{N-1} P_{j,M-1}^{(V)} \\ \sum_{i=0}^{M-1} P_{0,i}^{(H)} \\ \sum_{i=0}^{M-1} P_{j,i}^{(H)} \\ \sum_{i=0}^{M-1} P_{N-1,i}^{(H)} \\ 0 \\ 0 \end{bmatrix}$$

In equations (11) and (12) there are more equations than unknowns. Thus, the values may be determined using a suitable technique, such as a least squares mean. Specifically, equations (11) and (12) can be represented as $$AX = B \quad (13)$$

In such a representation as equation (13), the matrix A provides the model, matrix X contains the modified sensor values with reduced effects of unison noise to be calculated, and matrix B includes values generated from the measured sensor values in the first and second image. The matrix X containing the modified sensor values can be solved as:

$$X = [(A^T A)^{-1} A^T] B \tag{14}$$

In equation (14) the matrix $(A^T A)^{-1} A^T$ is an example of a deconvolution matrix that can be used to determine the sensor values in the modified image from the measured sensor values B.

Such a deconvolution matrix can be calculated during the design and implementation of the determination module 420. Typically, the deconvolution matrix would be calculated during design and used to generate hardware, firmware and/or software that perform the calculation in the determination module 420. So implemented, the processing system 400 can be used to reduce the effects of unison noise on the performance of the input device.

Thus, the embodiments of the present invention provide devices and methods that facilitate improved input device performance. Specifically, the devices and methods provide improved resistance to the effect of interference on input devices, and in particular, to the effect of unison noise on proximity sensors that use capacitive techniques to generate images of sensor values. The devices and methods provide improved resistance to the effects of interface by using multiple images of sensor values, where the multiple images of sensor values are captured at different times along two different axes. The multiple images of sensor values are combined to produce a modified image of sensor values, the modified image having reduced errors due to noise. This reduction in errors due to noise can improve the accuracy and performance of the input device.

In one embodiment, a processing system is provided for an input device having a plurality of sensor electrodes, where the processing system comprises a sensor module and a determination module. The sensor module comprises sensor circuitry configured to operate the plurality of sensor electrodes to capture first resulting signals and second resulting signals. The determination module is configured to generate a first image of sensor values from the first resulting signals, where the first image of sensor values has first errors associated with the first resulting signals being captured at different times along a first axis. The determination module is further configured to generate a second image of sensor values from the second resulting signals, where the second image of sensor values has second errors associated with the second resulting signals being captured at different times along a second axis different from the first axis. The determination module is further configured to produce a modified image of sensor values based on the first image of sensor values and the second image of sensor values, the modified image of sensor values having reduced errors compared with the first errors and the second errors. By providing a modified image having reduced errors, the processing system provides improved resistance to the effect of interference, and in particular, to the effect of unison noise, and thus can provide improved performance for the input device.

In another embodiment, a processing system operatively coupled to the plurality of sensor electrodes, the processing system configured to: selectively transmit first transmitter signals with first sensor electrodes; selectively transmit second transmitter signals with second sensor electrodes; selectively receive first resulting signals with the second sensor electrodes, wherein the first resulting signals comprise effects corresponding to the first transmitter signals; and selectively receive second resulting signals with the first sensor electrodes, wherein the second resulting signals comprise effects corresponding to the second transmitter signals; and generate a first image of sensor values from the first resulting signals, the first image of sensor values having first errors associated with unison noise; generate a second image of sensor values from the second resulting signals, the second image of sensor values having second errors associated with unison noise; and generate a modified image of sensor values based on the first image of sensor values and the second image of sensor values, the modified image of sensor values having reduced errors compared with the first errors and the second errors.

In another embodiment, an input device is provided a first plurality of sensor electrodes, each of the first plurality of sensor electrodes arranged to extend in a first axis; a second plurality of sensor electrodes, each of the second plurality of sensor electrodes arranged to extend in a second axis substantially perpendicular to the first axis, where the first plurality of first sensor electrodes and the second plurality of second sensor electrodes are configured to capacitively detect input objects in a sensing region; a processing system operatively coupled to the first plurality of sensor electrodes and the second plurality of sensor electrodes, the processing system configured to: selectively transmit first transmitter signals with the plurality of first sensor electrodes; selectively transmit second transmitter signals with the second plurality of second sensor electrodes; selectively receive first resulting signals with the second plurality of second sensor electrodes, wherein the first resulting signals comprise effects corresponding to the first transmitter signals, and wherein the first resulting signals are received on a set by set basis with each set corresponding to one of the first plurality of first sensor electrodes and each of the second plurality of second sensor electrodes, and where each set is received substantially simultaneously; and selectively receive second resulting signals with the first plurality of sensor electrodes, wherein the second resulting signals comprise effects corresponding to the second transmitter signals; and wherein the second resulting signals are received on a set by set basis with each set corresponding to one of the second plurality of second sensor electrodes and each of the first plurality of first sensor electrodes, and where each set is received substantially simultaneously; and generate a first image of sensor values from the first resulting signals, the first image of sensor values having first errors associated with unison noise and the set by set basis in which the first resulting signals are received, the first errors having a corresponding first error; generate a second image of sensor values from the second resulting signals, the second image of sensor values having second errors associated with unison noise and the set by set basis in which the second resulting signals are received, the second errors having a corresponding second error; generate a modified image of sensor values based on the first image of sensor values and the second image of sensor values, the modified image of sensor values generated to have a reduced error compared to the first error and the second error; and determine positional information for an input object in the sensing region based on the modified image of sensor values.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. A processing system for an input device having a plurality of sensor electrodes, the processing system comprising:
a sensor module comprising sensor circuitry configured to operate the plurality of sensor electrodes to capture first resulting signals and second resulting signals; and
a determination module configured to:
generate a first image of sensor values from the first resulting signals, the first image of sensor values having first errors associated with the first resulting signals being captured at different times along a first axis;
generate a second image of sensor values from the second resulting signals, the second image of sensor values having second errors associated with the second resulting signals being captured at different times along a second axis different from the first axis; and
combine the first image of sensor values and the second image of sensor values to produce a modified image of sensor values based on the first image of sensor values and the second image of sensor values, the modified image of sensor values having reduced errors compared with the first errors and the second errors.

2. The processing system of claim 1 wherein the processing system is configured to:
capture the first resulting signals by selectively transmitting first transmitter signals with first sensor electrodes in the plurality of sensor electrodes and selectively receiving the first resulting signals with second sensor electrodes in the plurality of sensor electrodes, wherein the first resulting signals comprise effects corresponding to the first transmitter signals; and
capture the second resulting signals by selectively transmitting second transmitter signals with the second sensor electrodes in the plurality of sensor electrodes and selectively receiving the second resulting signals with the first sensor electrodes in the plurality of sensor electrodes, wherein the second resulting signals comprise effects corresponding to the second transmitter signals.

3. The processing system of claim 1 wherein a first set of the first resulting signals corresponds to a column in the first image of sensor values and is captured substantially simultaneously, and wherein a second set of the second resulting signals corresponds to a row in the second image of sensor values and is captured substantially simultaneously.

4. The processing system of claim 1 wherein the sensor module is configured to operate the plurality of sensor electrodes to capture the first resulting signals and the second resulting signals by:
capturing the first resulting signals and the second resulting signals in an interleaved manner.

5. The processing system of claim 1 wherein the sensor module is configured to operate the plurality of sensor electrodes to capture the first resulting signals and the second resulting signals by:
capturing the first resulting signals and the second resulting signals in an alternating manner.

6. The processing system of claim 1 wherein the determination module is configured to produce the modified image of sensor values based on the first image of sensor values and the second image of sensor values by:
using least mean squares of the first errors and the second errors.

7. The processing system of claim 1 wherein the determination module is configured to produce the modified image of sensor values based on the first image of sensor values and the second image of sensor values by:
using a gradient descent approach.

8. The processing system of claim 1, further comprising a memory configured to store deconvolution values, wherein the determination module is configured to produce the modified image of sensor values based on the first image of sensor values and the second image of sensor values by:
using the deconvolution values stored in the memory.

9. An input device comprising:
a plurality of sensor electrodes configured to capacitively detect input objects in a sensing region; and
a processing system operatively coupled to the plurality of sensor electrodes, the processing system configured to:
operate the plurality of sensor electrodes to capture first resulting signals and second resulting signals;
generate a first image of sensor values from the first resulting signals, the first image of sensor values having first errors associated with the first resulting signals being captured at different times along a first axis;
generate a second image of sensor values from the second resulting signals, the second image of sensor values having second errors associated with the second resulting signals being captured at different times along a second axis different from the first axis; and
combine the first image of sensor values and the second image of sensor values to produce a modified image of sensor values based on the first image of sensor values and the second image of sensor values, the modified image of sensor values having reduced errors compared with the first errors and the second errors.

10. The input device of claim 9 wherein the plurality of sensor electrodes comprise first sensor electrodes extending along the second axis and second sensor electrodes extending along the first axis, and wherein the first resulting signals are received on the first sensor electrodes and the second resulting signals are received on the second sensor electrodes.

11. The input device of claim 9 wherein the plurality of sensor electrodes comprise first sensor electrodes each arranged to extend in the second axis and second sensor electrodes each arranged to extend in the first axis, and wherein the processing system is further configured to:
capture the first resulting signals by selectively transmitting first transmitter signals with the first sensor electrodes and selectively receiving the first resulting signals with the second sensor electrodes, wherein the first resulting signals comprise effects corresponding to the first transmitter signals; and
capture the second resulting signals by selectively transmitting second transmitter signals with the second sensor electrodes and selectively receiving the second resulting signals with the first sensor electrodes, wherein the second resulting signals comprise effects corresponding to the second transmitter signals.

12. The input device of claim 9 wherein the processing system is configured to operate the plurality of sensor electrodes to capture the first resulting signals and the second resulting signals by:
capturing the first resulting signals and the second resulting signals in an interleaved manner.

13. The input device of claim 9 wherein the processing system is configured to operate the plurality of sensor electrodes to capture the first resulting signals and the second resulting signals by:

capturing the first resulting signals and the second resulting signals in an alternating manner.

14. The input device of claim 9 further comprising a display circuitry proximate the plurality of sensor electrodes, and wherein no electrical shield layer is provided between the plurality of sensor electrodes and the display circuitry.

15. The input device of claim 9 wherein the processing system is configured to produce the modified image of sensor values based on the first image of sensor values and the second image of sensor values by:
using least mean squares of the first errors and the second errors or using a gradient descent approach.

16. The input device of claim 9 wherein the processing system further comprises a memory configured to store deconvolution values, and wherein the processing system is configured to produce the modified image of sensor values based on the first image of sensor values and the second image of sensor values by:
using the deconvolution values stored in the memory.

17. A method of determining input in an input device, the method comprising: operating a plurality of sensor electrodes to capture first resulting signals and second resulting signals;
generating a first image of sensor values from the first resulting signals, the first image of sensor values having first errors associated with the first resulting signals being captured at different times along a first axis;
generating a second image of sensor values from the second resulting signals, the second image of sensor values having second errors associated with the second resulting signals being captured at different times along a second axis different from the first axis;
combining the first image of sensor values and the second image of sensor values to produce a modified image of sensor values based on the first image of sensor values and the second image of sensor values, the modified image of sensor values having reduced errors compared with the first errors and the second errors; and
determining positional information for an input object based on the modified image of sensor values.

18. The method of claim 17 wherein the operating the plurality of sensor electrodes to capture the first resulting signals and the second resulting signals comprises:
capturing the first resulting signals by selectively transmitting first transmitter signals with first sensor electrodes in the plurality of sensor electrodes and selectively receiving the first resulting signals with second sensor electrodes in the plurality of sensor electrodes, wherein the first resulting signals comprise effects corresponding to the first transmitter signals; and
capturing the second resulting signals by selectively transmitting second transmitter signals with the second sensor electrodes in the plurality of sensor electrodes and selectively receiving the second resulting signals with the first sensor electrodes in the plurality of sensor electrodes, wherein the second resulting signals comprise effects corresponding to the second transmitter signals.

19. The method of claim 17 wherein the operating the plurality of sensor electrodes to capture the first resulting signals and the second resulting signals comprises:
capturing the first resulting signals and the second resulting signals in an alternating manner.

20. The method of claim 17 wherein the producing the modified image of sensor values based on the first image of sensor values and the second image of sensor values comprises:
using least mean squares of the first errors and the second errors or using a gradient descent approach.

21. The method of claim 17 wherein the producing the modified image of sensor values based on the first image of sensor values and the second image of sensor values comprises:
using deconvolution values stored in a memory.

22. An input device comprising:
a first plurality of first sensor electrodes, each of the first plurality of first sensor electrodes arranged to extend in a first axis;
a second plurality of second sensor electrodes, each of the second plurality of second sensor electrodes arranged to extend in a second axis substantially perpendicular to the first axis, where the first plurality of first sensor electrodes and the second plurality of second sensor electrodes are configured to capacitively detect input objects in a sensing region; and
a processing system operatively coupled to the first plurality of first sensor electrodes and the second plurality of second sensor electrodes, the processing system configured to:
selectively transmit first transmitter signals with the first plurality of first sensor electrodes;
selectively transmit second transmitter signals with the second plurality of second sensor electrodes;
selectively capture first resulting signals with the second plurality of second sensor electrodes, wherein the first resulting signals comprise effects corresponding to the first transmitter signals, and wherein the first resulting signals are captured on a set by set basis with each set corresponding to one of the first plurality of first sensor electrodes and each of the second plurality of second sensor electrodes, and where each set is captured substantially simultaneously; and
selectively capture second resulting signals with the first plurality of sensor electrodes, wherein the second resulting signals comprise effects corresponding to the second transmitter signals; and wherein the second resulting signals are captured on a set by set basis with each set corresponding to one of the second plurality of second sensor electrodes and each of the first plurality of first sensor electrodes, and where each set is captured substantially simultaneously; and
generate a first image of sensor values from the first resulting signals, the first image of sensor values having first errors associated with unison noise and the set by set basis in which the first resulting signals are captured, the first errors having a corresponding first error;
generate a second image of sensor values from the second resulting signals, the second image of sensor values having second errors associated with unison noise and the set by set basis in which the second resulting signals are captured, the second errors having a corresponding second error;
combine the first image of sensor values and the second image of sensor values to generate a modified image of sensor values based on the first image of sensor values and the second image of sensor values, the modified image of sensor values generated to have a reduced error compared to the first error and the second error; and
determine positional information for an input object in the sensing region based on the modified image of sensor values.

* * * * *